US011290511B2

(12) United States Patent
Suneya

(10) Patent No.: US 11,290,511 B2
(45) Date of Patent: Mar. 29, 2022

(54) PROVIDING APPARATUS, DATA PROVIDING METHOD, AND STORAGE MEDIUM

(71) Applicant: CANON KABUSHIKI KAISHA, Tokyo (JP)

(72) Inventor: Toru Suneya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/386,601

(22) Filed: Dec. 21, 2016

(65) Prior Publication Data

US 2017/0187779 A1 Jun. 29, 2017

(30) Foreign Application Priority Data

Dec. 28, 2015 (JP) ................................ 2015-256575

(51) Int. Cl.

| | |
|---|---|
| ***G06F 15/16*** | (2006.01) |
| ***H04L 65/60*** | (2022.01) |
| ***H04L 65/612*** | (2022.01) |
| ***H04L 67/02*** | (2022.01) |
| ***H04L 67/10*** | (2022.01) |
| *G06F 15/173* | (2006.01) |

(52) U.S. Cl.

CPC ........ *H04L 65/607* (2013.01); *H04L 65/4084* (2013.01); *H04L 67/02* (2013.01); *H04L 67/10* (2013.01)

(58) Field of Classification Search

CPC .......................... H04L 65/607; H04L 65/4084

USPC .......................................................... 709/217

See application file for complete search history.

(56) References Cited

U.S. PATENT DOCUMENTS

| | | | | |
|---|---|---|---|---|
| 9,883,011 | B2 * | 1/2018 | Denoual | H04N 21/234327 |
| 2005/0271283 | A1 * | 12/2005 | Dekel | H04N 1/3873 382/232 |
| 2007/0024706 | A1 * | 2/2007 | Brannon, Jr. | H04N 7/17318 348/142 |
| 2010/0158099 | A1 * | 6/2010 | Kalva | H04N 21/23412 375/240.01 |
| 2011/0072078 | A1 * | 3/2011 | Chai | G06F 17/30044 709/203 |
| 2012/0246218 | A1 * | 9/2012 | Adimatyam | H04L 65/4084 709/203 |
| 2014/0052770 | A1 | 2/2014 | Gran et al. | |
| 2014/0079126 | A1 * | 3/2014 | Ye | H04N 19/105 375/240.16 |
| 2014/0082054 | A1 * | 3/2014 | Denoual | H04N 19/25 709/203 |

(Continued)

FOREIGN PATENT DOCUMENTS

| | | | | |
|---|---|---|---|---|
| JP | 2014-520442 A | | 8/2014 | |
| WO | WO2014170176 | * | 10/2014 | H04N 21/4728 |

*Primary Examiner* — Karen C Tang

(74) *Attorney, Agent, or Firm* — Canon U.S.A., Inc. I.P. Division

(57) ABSTRACT

A providing apparatus includes a generation unit configured to generate description data describing address information to request one or more of a plurality of first segments acquired by spatially and timely segmenting a moving image, and address information to request a second segment corresponding to a spatial region broader than the first segment and a providing unit configured to provide the description data generated by the generation unit to a client apparatus.

16 Claims, 9 Drawing Sheets

(56) References Cited

U.S. PATENT DOCUMENTS

2014/0089990 A1* 3/2014 van Deventer ...... H04N 21/218
725/61
2014/0307775 A1* 10/2014 Ouedraogo .......... H04N 19/159
375/240.02
2016/0080833 A1* 3/2016 Denoual .......... H04N 21/23432
725/116
2017/0118540 A1* 4/2017 Thomas ........... H04N 21/85406
2018/0041610 A1* 2/2018 Denoual .......... H04N 21/23432

* cited by examiner

FIG. 5

```
<?xml version="1.0"?>
<MPD>
  <BaseURL>http://example.com/segments </BaseURL>
  <Period>
401  <AdaptationSet>
      <Representation id="FI" codecs="jpeg" mimeType="image/jpeg">
        <SupplementalProperty schemeIdUri=" urn:mpeg:dash:srd:2014"  value="1 0 0 1920 1080"/>
        <Role schemeIdUri=" urn:mpeg:dash:role:2011" value="main"/>
        <BaseURL> FullImage.jpg</BaseURL>
      </Representation>
    </AdaptationSet>
402 <AdaptationSet>
      <Representation id="FV" codecs="hev1" mimeType="video/mp4">
        <SupplementalProperty schemeIdUri=" urn:mpeg:dash:srd:2014"  value="1 0 0 1920 1080"/>
        <Role schemeIdUri=" urn:mpeg:dash:role:2011" value="main"/>
        <BaseURL> FullView.mp4</BaseURL>
      </Representation>
    </AdaptationSet>
403 <AdaptationSet>
      <Representation id="ROI1" codecs="hev1" mimeType="video/mp4">
        <SupplementalProperty schemeIdUri=" urn:mpeg:dash:srd:2014"  value="1 0 0 960 540"/>
        <Role schemeIdUri=" urn:mpeg:dash:role:2011" value="alternate"/>
        <BaseURL> ROI1.mp4</BaseURL>
      </Representation>
    </AdaptationSet>
    <AdaptationSet>
      <Representation id="ROI2" codecs="hev1" mimeType="video/mp4">
        <SupplementalProperty schemeIdUri=" urn:mpeg:dash:srd:2014"  value="1 960 0 960 540"/>
        <Role schemeIdUri=" urn:mpeg:dash:role:2011" value="alternate"/>
        <BaseURL> ROI1.mp4</BaseURL>
      </Representation>
    </AdaptationSet>
    <AdaptationSet>
      <Representation id="ROI3" codecs="hev1" mimeType="video/mp4">
        <SupplementalProperty schemeIdUri=" urn:mpeg:dash:srd:2014"  value="1 0 540 960 540"/>
        <Role schemeIdUri=" urn:mpeg:dash:role:2011" value="alternate"/>
        <BaseURL> ROI1.mp4</BaseURL>
      </Representation>
    </AdaptationSet>
    <AdaptationSet>
      <Representation id="ROI4" codecs="hev1" mimeType="video/mp4">
        <SupplementalProperty schemeIdUri=" urn:mpeg:dash:srd:2014"  value="1 960 540 960 540"/>
        <Role schemeIdUri=" urn:mpeg:dash:role:2011" value="alternate"/>
        <BaseURL> ROI2.mp4</BaseURL>
      </Representation>
    </AdaptationSet>
  </Period>
</MPD>
```

FIG. 8

```
<?xml version="1.0"?>
<MPD>
  <BaseURL>http://example.com/segments </BaseURL>
  <Period>
    <AdaptationSet>
      <Representation id="FI1" codecs="jpeg" mimeType="image/jpeg">
        <SupplementalProperty schemeIdUri=" urn:mpeg:dash:srd:2014"  value="1 0 0 1920 1080"/>
701     <Role schemeIdUri=" urn:mpeg:dash:role:2011" value="main"/>
        <BaseURL> FullImage1.jpg</BaseURL>
      </Representation>
    </AdaptationSet>
    <AdaptationSet>
      <Representation id="FI2" codecs="jpeg" mimeType="image/jpeg">
        <SupplementalProperty schemeIdUri=" urn:mpeg:dash:srd:2014"  value="2 0 0 1280 720"/>
702     <Role schemeIdUri=" urn:mpeg:dash:role:2011" value="main"/>
        <BaseURL> FullImage2.jpg</BaseURL>
      </Representation>
    </AdaptationSet>
    <AdaptationSet>
      <Representation id="FI3" codecs="jpeg" mimeType="image/jpeg">
        <SupplementalProperty schemeIdUri=" urn:mpeg:dash:srd:2014"  value="3 0 0 960 540"/>
703     <Role schemeIdUri=" urn:mpeg:dash:role:2011" value="main"/>
        <BaseURL> FullImage3.jpg</BaseURL>
      </Representation>
    </AdaptationSet>
    <AdaptationSet>
      <Representation id="FV" codecs="hev1" mimeType="video/mp4">
        <SupplementalProperty schemeIdUri=" urn:mpeg:dash:srd:2014"  value="1 0 0 1920 1080"/>
        <Role schemeIdUri=" urn:mpeg:dash:role:2011" value="main"/>
        <BaseURL> FullView.mp4</BaseURL>
      </Representation>
    </AdaptationSet>
    <AdaptationSet>
      <Representation id="ROI1" codecs="hev1" mimeType="video/mp4">
        <SupplementalProperty schemeIdUri=" urn:mpeg:dash:srd:2014"  value="1 0 0 960 540"/>
        <Role schemeIdUri=" urn:mpeg:dash:role:2011" value="alternate"/>
        <BaseURL> ROI1.mp4</BaseURL>
      </Representation>
    </AdaptationSet>
                          ⋮
```

PROVIDING APPARATUS, DATA PROVIDING METHOD, AND STORAGE MEDIUM

BACKGROUND OF THE INVENTION

Field of the Invention

The present invention relates to a providing apparatus, a data providing method, and a storage medium.

Description of the Related Art

Real time distribution systems which distribute streaming contents including audio and video data have been provided. These distribution systems enable a user to access desired contents such as live video in real time through his/her terminal device.

In addition, widespread use of terminals including smartphones and tablets have increased demand for accessing the streaming contents anytime and anywhere with various terminal devices. To meet such demand, Dynamic Adaptive Streaming over Http (MPEG-DASH) attracts attention as a technology which dynamically changes stream data to be acquired by the terminal device in accordance with the capability and communication status of the terminal device.

MPEG-DASH is a technology which divides the video data into segments containing a short interval of playback time and describes Uniform Resource Locator (URL) for acquiring the segment in a file called a playlist. A reception apparatus acquires the playlist, and acquires the desired video data using information described in the playlist. A plurality of versions of URLs for video data segments described in the playlist enable the reception apparatus to acquire the most appropriate version of the video data segment in accordance with the capability and the communication environment of the reception apparatus.

In addition, a following technology on MPEG-DASH has been studied to address a high-resolution trend of the video data and widespread use of the smartphone as a video playback terminal in recent years. That is an extension technology in which the video data on the region of interest (hereinafter, ROI) in the video data is extracted to be distributed. The extension technology is performed by coding the video data in a tiled form, and properly selecting the tile to be distributed.

For example, current Content Delivery Network (CDN) technology is not configured to handle the above described video data coded in the tiled form. Instead of such configuration, Japanese Unexamined Patent Application Publication (Translation of PCT Application) No. 2014-520442 discusses a method for ROI video data distribution using current CDN by describing tile information such as a location, time stamp, and resolution in the playlist.

However, the conventional technology may take time to acquire an image of an entire video region. That is, for playing back a video of the entire video region using the conventional technology, video data for at least one segment needs to be acquired, and thus, playing back the video of the entire video region may take time. Further, a reception side generally starts video playback after acquiring the video data for a predetermined time period to prevent a buffer underrun. Accordingly, it is difficult to visually check the video of the entire video region promptly. Here, the buffer underrun is a state in which writing cannot be processed because data transmission speed to a write buffer does not catch up with writing speed. Note that, although the above example describes the playback of the video of the entire video region, it is not limited to the entire video region, and, for example, a wide-range region including the video region corresponding to a plurality of tiles may be applied.

SUMMARY OF THE INVENTION

The present disclosure is directed to acquiring an image of a wide-range video region more quickly.

According to an aspect of the present invention, a providing apparatus includes a generation unit configured to generate description data describing address information to request one or more of a plurality of first segments acquired by spatially and timely segmenting a moving image, and address information to request a second segment corresponding to a spatial region broader than the first segment, and a providing unit configured to provide the description data generated by the generation unit to a client apparatus.

Further features of the present disclosure will become apparent from the following description of exemplary embodiments with reference to the attached drawings.

BRIEF DESCRIPTION OF THE DRAWINGS

FIG. 5 illustrates an example of a playlist.

FIG. 8 illustrates an example of a playlist corresponding to a still image with a plurality of resolutions.

DESCRIPTION OF THE EMBODIMENTS

An exemplary embodiment of the present disclosure will be described with reference to the drawings.

Figure 1:
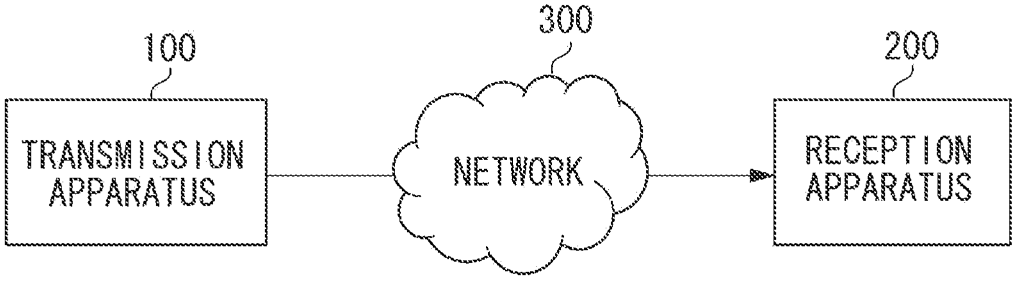
FIG. 1 illustrates an example of a system configuration of a communication system.

FIG. 1 illustrates an example of a system configuration of a communication system. A transmission apparatus 100 connects to a reception apparatus 200 through a network 300. The transmission apparatus 100 may be plural and the reception apparatus 200 may be plural as well.

Specific examples of the transmission apparatus 100 include a camera apparatus, a video camera apparatus, a smartphone, a personal computer (PC), and a cellular phone. However, the transmission apparatus 100 is not limited to the above examples and any apparatus fulfilling a functional configuration described below can be used.

The reception apparatus 200 has a content playback/display function, a communication function, and a user input acceptance function. Specific examples of the reception apparatus 200 include a smartphone, a PC, a television, and a cellular phone. However, the reception apparatus 200 is not limited to the above examples and any apparatus fulfilling a functional configuration described below can be used.

The network 300 may be, for example, a wired local area network (LAN), and wireless LAN. However, the network 300 is not limited to the above, and may be the Internet, a wide area network (WAN) such as 3G/4G/LTE, an ad hoc network, and Bluetooth®.

Figure 2:
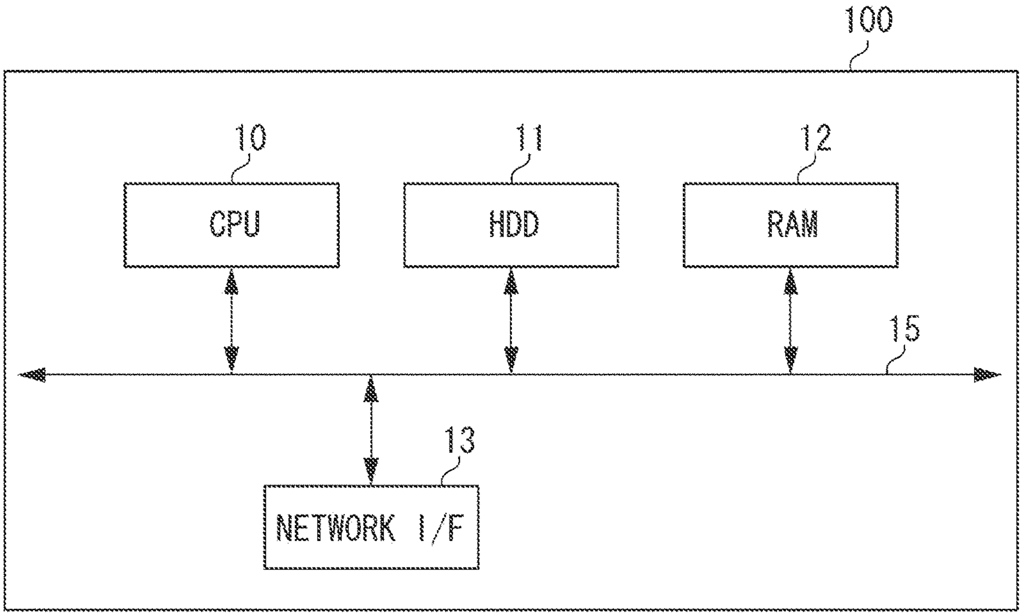
FIG. 2 illustrates an example of a hardware configuration of a transmission apparatus.

A hardware configuration of the transmission apparatus 100 according to the present exemplary embodiment will be described with reference to FIG. 2. FIG. 2 illustrates an example of a hardware configuration of the transmission apparatus 100. As illustrated in FIG. 2, the transmission apparatus 100 includes, as a hardware configuration, a central processing unit (CPU) 10, a hard disk drive (HDD) 11, a random-access memory (RAM) 12, and a network interface (I/F) 13. Each configuration of the transmission apparatus 100 is connected to each other via a bus 15. The CPU 10 controls the entire transmission apparatus 100. The HDD 11 stores programs, data to be transmitted to the reception apparatus 200, and data used when the CPU 10 executes a process based on the program. The RAM 12 is a main memory of the transmission apparatus 100, and is used when the CPU 10 executes a program read from the HDD 11. The network I/F 13 is an interface connecting the transmission apparatus 100 to the network 300. The CPU 10 executes the processes based on the programs to perform functional configurations of the transmission apparatus 100 illustrated in FIG. 3 described below, and to perform the processes by the transmission apparatus 100 illustrated in sequence diagrams of FIGS. 6 and 7 described below. The hardware configuration of the reception apparatus 200 is similar to the hardware configuration of the transmission apparatus 100 illustrated in FIG. 2. However, the reception apparatus 200 further includes a display device, an input device and the like as a hardware configuration. The CPU of the reception apparatus 200 executes the processes based on the programs stored in the HDD and the like of the reception apparatus 200 to perform the reception apparatus 200 functions, and the reception apparatus 200 processes illustrated in sequence diagrams of FIGS. 6 and 7 described below.

Figure 3:
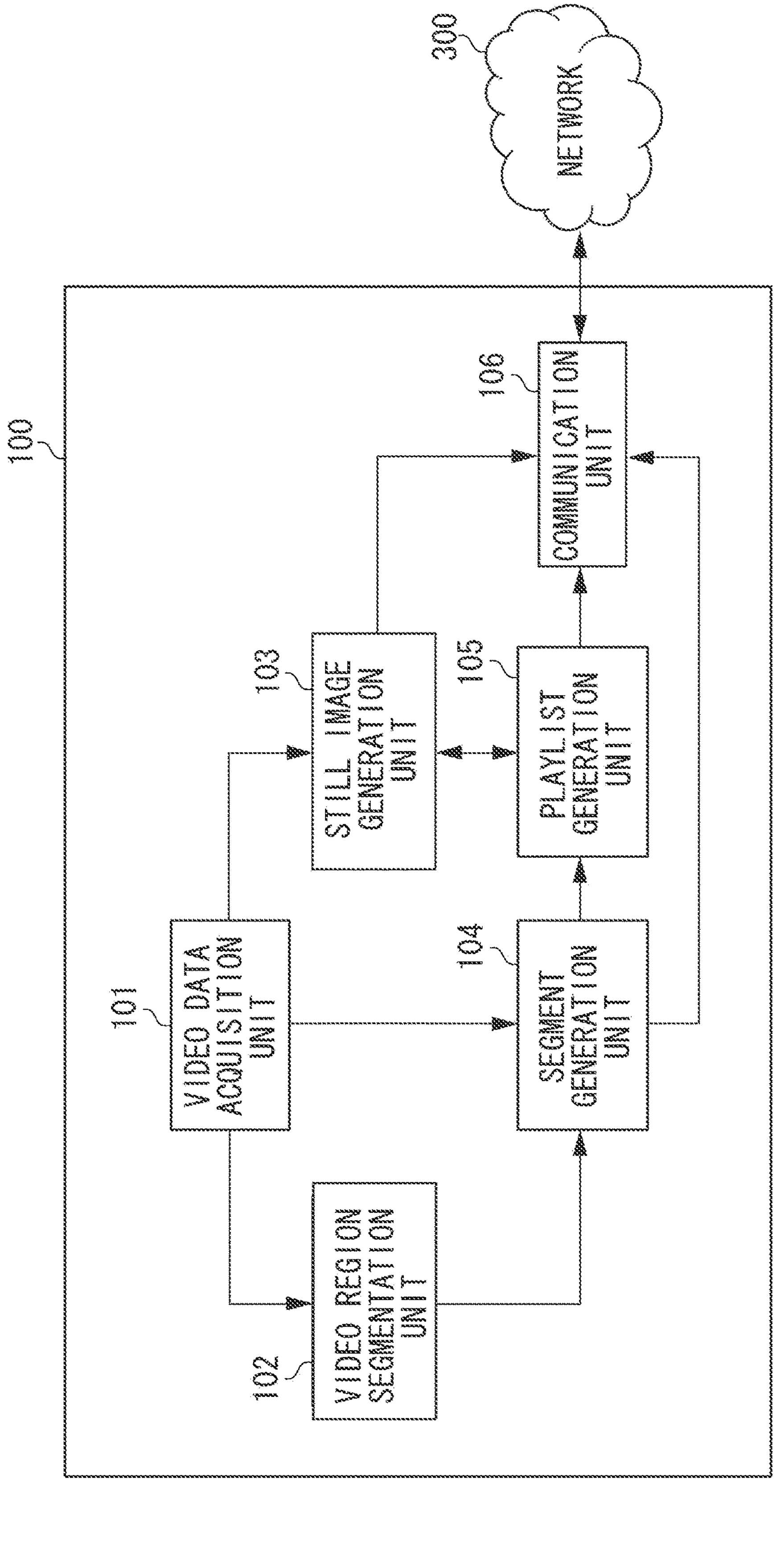
FIG. 3 illustrates an example of a functional configuration of the transmission apparatus.

The functional configuration of the transmission apparatus 100 according to the present exemplary embodiment will be described with reference to FIG. 3. FIG. 3 illustrates an example of the functional configuration of the transmission apparatus 100. As illustrated in FIG. 3, the transmission apparatus 100 includes, as a functional configuration, a video data acquisition unit 101, a video region segmentation unit 102, a still image generation unit 103, a segment generation unit 104, a playlist generation unit 105, and a communication unit 106.

The video data acquisition unit 101 acquires video data that has not been coded yet. The video region segmentation unit 102 segments the acquired video data into regions with a set resolution. The segment generation unit 104 codes the region-segmented video data acquired from the video region segmentation unit 102 to generate segments. Further, the segment generation unit 104 codes the video data as it is acquired from the video data acquisition unit 101 to generate a segment of the entire video region. The segment generation unit 104 does not segment the video data acquired from the video data acquisition unit 101 in the above process. The still image generation unit 103 codes a newest frame of the video data into a still image at a set cycle, upon a request from the reception apparatus 200, or upon playlist generation timing notified from the playlist generation unit 105.

Systems for performing region segmentation and coding may include High Efficiency Video Codec (HEVC) and Joint Photographic Experts Group (JPEG) 2000 which can perform region segmentation and coding with regard to videos or images. Systems for still image coding may include still image formats such as Joint Photographic Experts Group (JPEG), JPEG 2000, and WebP, and may further include an intra-coded frame (I frame) in a coding method for moving images using interframe prediction such as ITU-T Rec. H.264|ISO/IEC 14496-10 Advanced Video Coding (H.264), SMPTE 421M (VC1), and HEVC. I frame can be used as a still image coding system since the I frame is coded without using interframe prediction technology, and thus can be independently decoded.

The playlist generation unit 105 generates a playlist listing a URL enabling access to the still image created by the still image generation unit 103 and the segment created by the segment generation unit 104. The communication unit 106 transmits, in response to the request from the reception apparatus 200, the generated playlist, the segment, and the still image to the reception apparatus 200 through the network 300. In the present exemplary embodiment, the URL is used for the description as an example of an identifier. However, the identifier is not limited to the above. For example, a Uniform Resource Name (URN) and a Uniform Resource Identifier (URI) may be used.

Figure 4:
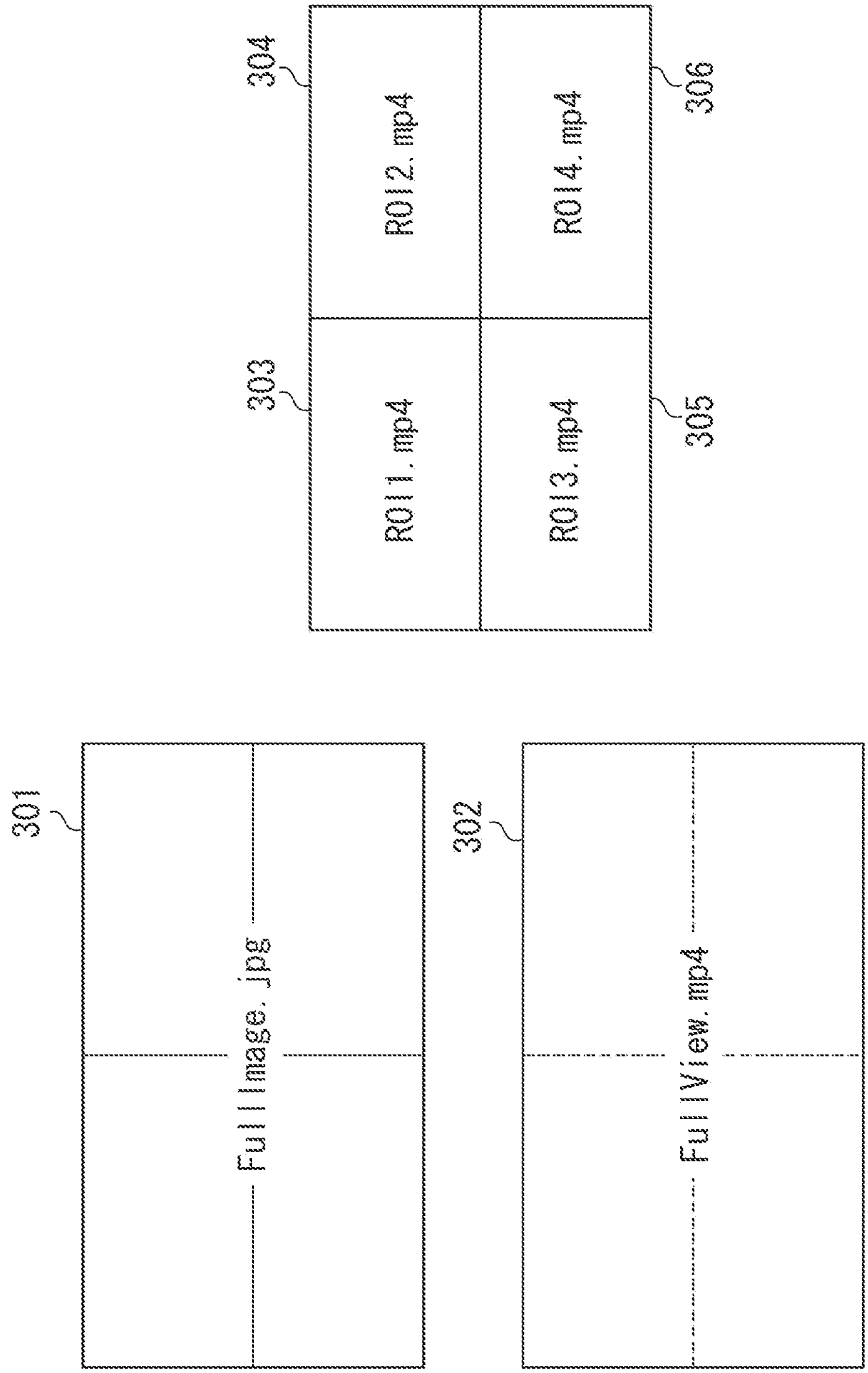
FIG. 4 illustrates an example of video region segmentation.

An example of a segment generated by segmenting a video region will be described with reference to FIG. 4. FIG. 4 illustrates an example of the video region segmentation.

In FIG. 4, FullImage.jpg 301 and FullView.mp4 302 are the data in which an entire video region has been coded into a still image and a moving image, respectively. The still image is generated by the still image generation unit 103, and the moving image is a segment generated by the segment generation unit 104. ROI1.mp4 303 to ROI4.mp4 306 are segments generated by vertically and horizontally bisecting these video regions. The video region may be further segmented, and may not be bisected. The segment generated by the region segmentation as illustrated in FIG. 4 is hereinafter described as an ROI segment.

The contents of the playlist will be described with reference to FIG. 5. FIG. 5 illustrates an example of the playlist.

FIG. 5 illustrates a playlist corresponding to streaming of an ROI portion based on the standard under developing for MPEG-DASH. In the present exemplary embodiment, information on a still image of information 401 is additionally extended. The information 401 and information 402 in FIG. 5 illustrate information on the still image and the moving image of the entire video region, respectively. In addition to the information on a coding system, a format, and the like, the playlist lists resolution information and spatial location information in a Supplemental Property portion. Further, "main" listed in a Role portion of the playlist indicates the entire video based on which the video region is segmented. FIG. 5 indicates that the information 401 and the information 402 are the entire video data with 1920×1080 resolution, and the information 401 and the information 402 are still image (JPEG) data and moving image (HEVC) data, respectively.

Information 403 in FIG. 5 illustrates information on the ROI segments described in FIG. 4, and illustrates that each ROI segment is a moving image (HEVC) with 960×540 resolution, and located in one of the sections where the entire video with 1920×1080 resolution is vertically and horizontally bisected as illustrated in FIG. 4. The term, "alternate" listed in the Role portion means a part of the entire video. The reception apparatus 200 uses the URL listed in a Base URL to send a request to the transmission apparatus 100 when acquiring the still image of the entire video region or each ROI segment whose name is listed in the playlist illustrated in FIG. 5.

Figure 6:
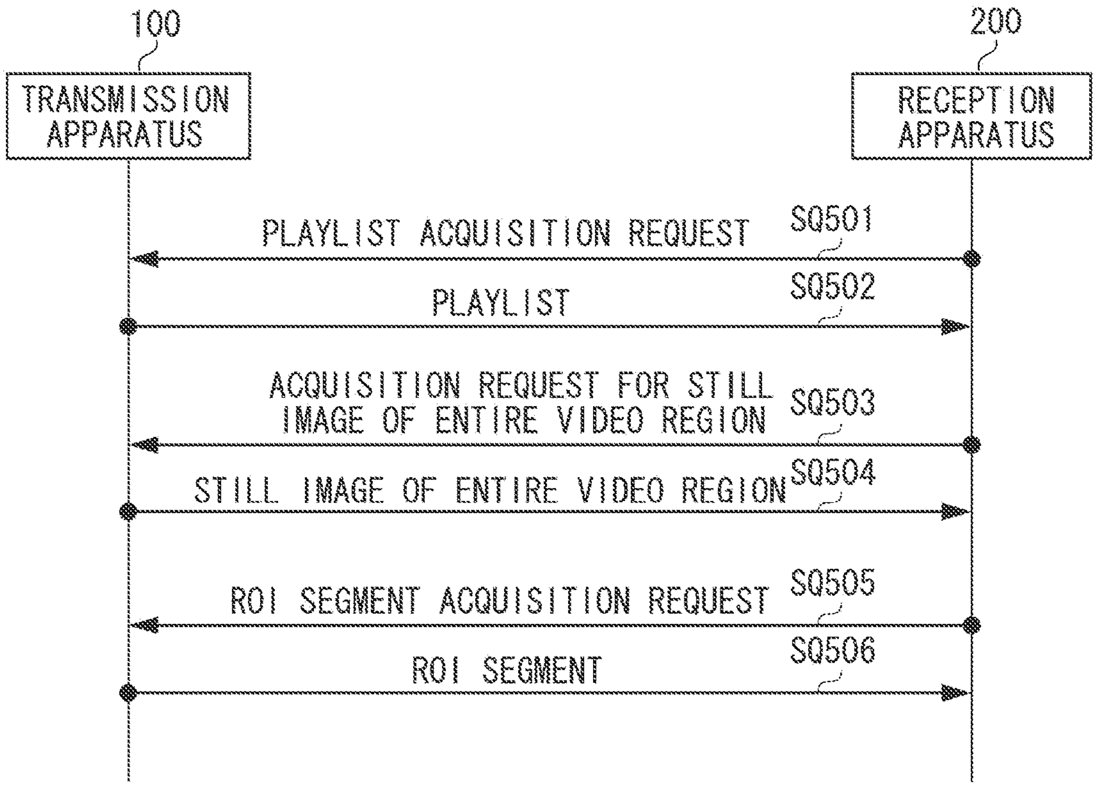
FIG. 6 is a sequence diagram illustrating an information process between the transmission apparatus and a reception apparatus.
Figure 7:
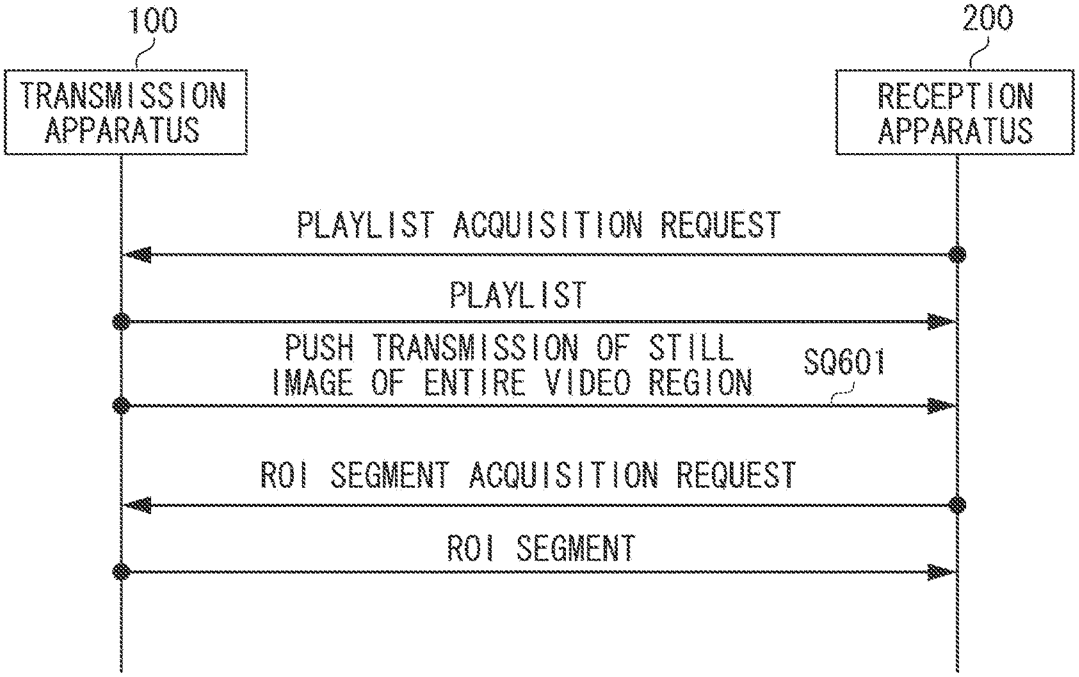
FIG. 7 is a sequence diagram illustrating an information process between the transmission apparatus and the reception apparatus.

Communications between the transmission apparatus 100 and the reception apparatus 200 will be described with reference to FIG. 6 and FIG. 7. FIG. 6 and FIG. 7 illustrate sequence diagrams each illustrating an example of information processing between the transmission apparatus 100 and the reception apparatus 200.

In FIG. 6, in SQ501, the reception apparatus 200 transmits a playlist acquisition request to the transmission apparatus 100. In SQ502, the transmission apparatus 100 transmits the playlist to the reception apparatus 200 in response to the playlist acquisition request. The process in SQ502 is an example of a first transmission process. As described above with reference to FIG. 5, the URL for acquiring the still image of the entire video region is listed in the playlist. In SQ503, upon detecting a URL designation operation by a user through an input device and the like, the reception apparatus 200 requests an acquisition of the still image of the entire video region to the transmission apparatus 100. In SQ504, the transmission apparatus 100 transmits the still image of the entire video region to the reception apparatus 200 in response to the request. The process in SQ504 is an example of a second transmission process.

In SQ505, the user operating the reception apparatus 200 visually checks the acquired still image by performing a playback operation thereon to determine a next ROI segment to be acquired which belongs to one of the regions, and operates the reception apparatus 200 to send a request for acquiring a desired ROI segment to the transmission apparatus 100. In SQ506, the transmission apparatus 100 transmits the designated ROI segment to the reception apparatus 200 in response to the request.

An example, which partially changes the sequence in FIG. 6 to enable acquisition of the ROI segment more quickly, will be described with reference to FIG. 7. FIG. 7 is different from FIG. 6 in a method for acquiring the still image of the entire video region. In FIG. 6, the transmission apparatus 100 transmits the still image according to the request from the reception apparatus 200 as in SQ503 and SQ504. However, in FIG. 7, the transmission apparatus 100 performs a push transmission of the still image as in SQ601 after the playlist transmission to enable the reception apparatus 200 to check the entire video region more quickly. The process in SQ601 is an example of the second transmission process.

Conventionally, the reception apparatus 200 needs to acquire the segment of the entire video region as illustrated in the information 402 in FIG. 5 for the playback to check the video of the entire video region. Thus, the time period for segment generation at the transmission apparatus 100, network transmission, and buffering at the reception apparatus 200 prevent the user from determining the ROI segment quickly. However, in the present exemplary embodiment, the transmission apparatus 100 needs to transmit only one still image of the entire video region coded into JPEG, for example, and the reception apparatus 200 plays back the same to check the entire video region. Accordingly, in the technology of the present exemplary embodiment, the user can check the entire video region promptly to determine the ROI segment quickly. In addition to the above, a communication data amount can be reduced comparing with the conventional technology which needs to acquire the segment of the entire video region.

A case which can provide a still image of the entire video region in a plurality of resolutions will be described below.

FIG. 8 illustrates an example of a playlist listing a still image with a plurality of resolutions. In FIG. 8, information 701, 702, and 703 illustrate that the still image of the entire video region is provided in different resolutions, i.e., 1920×1080, 1280×720, and 960×540, respectively.

For example, when a high resolution image is not necessary for visually checking the status of the entire video region, lower resolution data can be used to reduce a data amount and a process load. Accordingly, the reception apparatus 200 may acquire the still image of the information 703 having the minimum resolution required for the visual check.

In addition to the above described case where the still image is acquired for determining the ROI segment to be acquired when the user starts the video data viewing, another case is conceivable. In the case, the still image of the entire video region may be acquired regularly or irregularly for user's checking the status of other regions during the ROI segment viewing. Even in the above usage, for example, acquiring the still image with an appropriate resolution at appropriate timing according to a network resource use status and a processing load of the reception apparatus 200 can increase efficiency in view of the resource consumption and the processing load.

FIG. 8 illustrates a part of the playlist.

Figure 9:
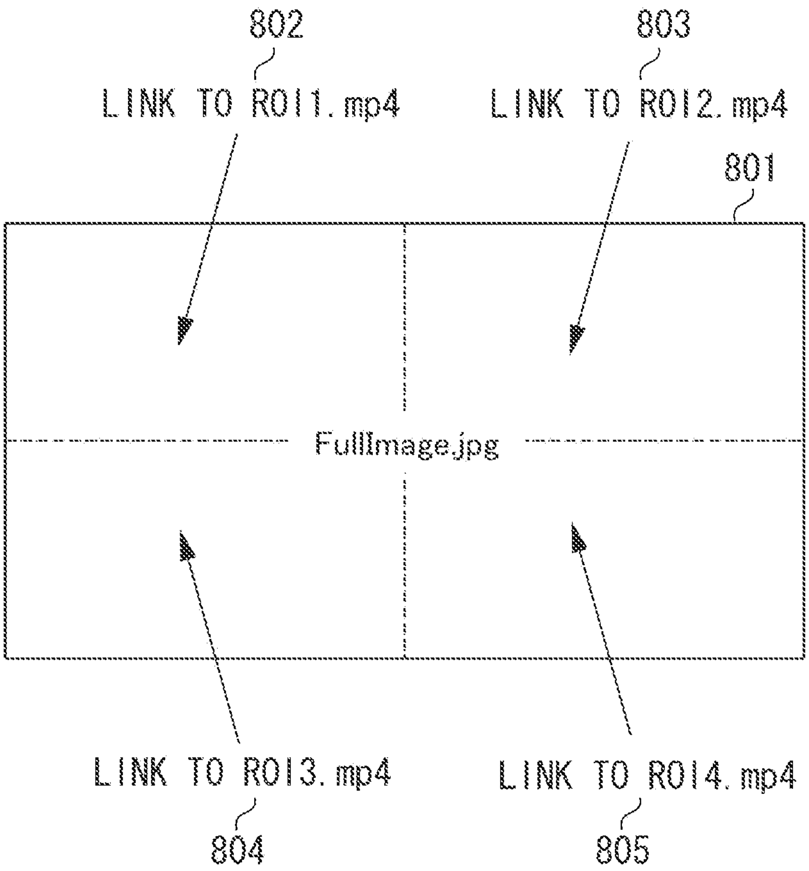
FIG. 9 illustrates an example of a still image of an entire video region with a clickable map.

FIG. 9 illustrates an example of a still image of the entire video region with a clickable map. In FIG. 9, a still image 801 is a still image of the entire video region with a clickable map, and is vertically and horizontally bisected to form regions 802 to 805. The regions 802 to 805 include a URL link to acquire an ROI segment corresponding to each region where the ROI segment belongs. The clickable map is a function in which a link destination has been set in an image, and providing link information depending on the clicked location.

Using the above process, the user operating the reception apparatus 200 visually checks the still image to determine the ROI segment to be acquired after acquiring the still image with a clickable map from the transmission apparatus 100. Then, the user can easily send a request for acquiring the desired ROI segment using a mouse-click or a touch.

Although an exemplary embodiment of the present disclosure has been minutely described above, the present disclosure is not limited to the above specific embodiment. The hardware configuration of the transmission apparatus 100 is not limited to the configuration illustrated in FIG. 2, and may include an input device or a display device. Further, the transmission apparatus 100 may include a plurality of CPUs or a plurality of network I/Fs. The reception apparatus 200 is not limited to the above minutely described embodiment of the present disclosure, and may include an input device or a display device as the hardware configuration, and a plurality of CPUs or a plurality of network I/Fs as the transmission apparatus 100. In addition, the functional configuration of the transmission apparatus 100 may be partially or fully implemented to the transmission apparatus 100 as the hardware configuration.

According to the process of the exemplary embodiment described above, listing the still image of the entire video region in the playlist enables the user to acquire the still image of the entire video region anytime. Further, the push transmission of the still image of the entire video region upon transmitting the playlist enable the user to visually check the video of the entire video region more quickly. The present exemplary embodiment mainly describes an example of listing information (URL) for acquiring the still image of the entire video region in the playlist, and describes an example of push transmission of the still image of the entire video region. However, the region for the acquisition is not limited to the entire region, and the region may be narrower than the described entire region. For example, in the case where four regions are defined by segmenting the entire video region in vertical and horizontal directions, the still image of the video region in the upper-right may be transmitted in response to the user designating the region in the upper-right. In the above case, the user can refer to the described still image and designate the ROI. Further, the above process can reduce a data transmission amount comparing with the process transmitting the still image of the entire video region every time.

In the above described exemplary embodiment, an example in which the still image generation unit 103 generates the still image is mainly described. However, the exemplary embodiment is not limited to the above. The still image generation unit 103 may generate a segment corresponding to a period of time shorter than the time for the segment generated by the generation unit 104. Further, in the exemplary embodiment described above, an example is described in which the still image generation unit 103 generates the still image of the entire video region. However, the exemplary embodiment is not limited to the above. The still image generation unit 103 may generate a segment corresponding to the range broader than the range for the segment generated by the generation unit 104. In an example of FIG. 4, the segment generation unit 104 may generate segments of the regions corresponding to the segments 303 to 306, and the still image generation unit 103 may generate a still image corresponding to the segments 303 to 305 in FIG. 4.

The configuration according to the present exemplary embodiment described above enables a wide-range video region image to be acquired more quickly.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-256575, filed Dec. 28, 2015, which is hereby incorporated by reference herein in its entirety.

What is claimed is:

1. A providing apparatus comprising:

one or more processors; and at least one memory storing one or more programs configured to be executed by the one or more processors, the one or more programs including instructions for:

generating description data including at least: (i) position information representing a spatial position of each of a plurality of spatial regions within a video, (ii) size information representing a spatial size of each of the plurality of spatial regions within the video, and (iii) a plurality of pieces of address information each of which is used for requesting image data of one of the plurality of spatial regions;

providing, to a client apparatus, the description data and image data of a broad spatial region including the plurality of spatial regions in response to a request for the description data from the client apparatus, wherein the image data of the broad spatial region including the plurality of spatial regions is push transmitted immediately after transmitting the description data without specific request for the image data of the broad spatial region including the plurality of spatial regions; and transmitting, to the client apparatus, one or more segments including image data of a spatial region according to a request containing the address information from the client apparatus.

2. The providing apparatus according to claim 1, wherein the broad spatial region is identical to a spatial region of the video.

3. The providing apparatus according to claim 1, wherein the image data of the broad spatial region is a still image.

4. The providing apparatus according to claim 1, wherein the description data includes first address information that is used for requesting image data of the broad spatial region and having a first resolution, and second address information that is used for requesting image data of the broad spatial region and having a second resolution which is different from the first resolution.

5. The providing apparatus according to claim 1, wherein the address information is a URL.

6. The providing apparatus according to claim 1, wherein the description data is a playlist used in MPEG-DASH.

7. The providing apparatus according to claim 1, wherein the description data is a playlist used in MPEG-DASH.

8. The providing apparatus according to claim 1, wherein the immediate push transmission is that the image data of the broad spatial region is push transmitted before receiving the request containing the address information from the client apparatus.

9. A data providing method comprising:

generating description data including at least: (i) position information representing a spatial position of each of a plurality of spatial regions within a video, (ii) size information representing a spatial size of each of the plurality of spatial regions within the video, and (iii) a plurality of pieces of address information each of which is used for requesting image data of one of the plurality of spatial regions;

providing the description data to a client apparatus and image data of a broad spatial region including the plurality of spatial regions in response to a request for the description data from the client apparatus, wherein the image data of the broad spatial region including the plurality of spatial regions is push transmitted immediately after transmitting the description data without specific request for the image data of the broad spatial region including the plurality of spatial regions; and transmitting, to the client apparatus, one or more segments including image data of a spatial region according to a request containing the address information from the client apparatus.

10. A non-transitory computer-readable storage medium storing a program for causing a computer to execute a method comprising:

generating description data including at least: (i) position information representing a spatial position of each of a plurality of spatial regions within a video, (ii) size information representing a spatial size of each of the plurality of spatial regions within the video, and (iii) a plurality of pieces of address information each of which is used for requesting image data of one of the plurality of spatial regions;

providing the description data to a client apparatus and image data of a broad spatial region including the plurality of spatial regions in response to a request for the description data from the client apparatus, wherein the image data of the broad spatial region including the plurality of spatial regions is push transmitted immediately after transmitting the description data without specific request for the image data of the broad spatial region including the plurality of spatial regions; and transmitting, to the client apparatus, one or more segments including image data of a spatial region according to a request containing the address information from the client apparatus.

11. A receiving apparatus, comprising:

one or more processors; and at least one memory storing one or more programs configured to be executed by the one or more processors, the one or more programs including instructions for:

transmitting a request for description data to a providing apparatus;

receiving the description data and image data of a broad spatial region from the providing apparatus, wherein the description data includes at least (i) position information representing a spatial position of each of a plurality of spatial regions within a video, (ii) size information representing a spatial size of each of the plurality of spatial regions within the video, and (iii) a plurality of pieces of address information each of which is used for requesting image data of one of the plurality of spatial regions, wherein the image data of a broad spatial region includes the plurality of spatial regions, wherein the image data of the broad spatial region including the plurality of spatial regions is push transmitted immediately after transmitting the description data without specific request for the image data of the broad spatial region including the plurality of spatial regions;

transmitting a request containing the address information to the providing apparatus; and receiving one or more segments corresponding to the address information from the providing apparatus.

12. The receiving apparatus according to claim 11, wherein the image data of the broad spatial region is a still image.

13. The receiving apparatus according to claim 11, wherein the one or more programs include instructions for displaying a screen based on the image data of a broad spatial region including the plurality of spatial regions.

14. The receiving apparatus according to claim 11, wherein the immediate push transmission is that the image data of the broad spatial region is push transmitted before the providing apparatus receives the request containing the address information.

15. A data receiving method, comprising:

transmitting a request for description data to a providing apparatus;

receiving the description data and image data of a broad spatial region from the providing apparatus, wherein the description data includes at least (i) position information representing a spatial position of each of a plurality of spatial regions within a video, (ii) size information representing a spatial size of each of the plurality of spatial regions within the video, and (iii) a plurality of pieces of address information each of which is used for requesting image data of one of the plurality of spatial regions, wherein the image data of a broad spatial region includes the plurality of spatial regions, wherein the image data of the broad spatial region including the plurality of spatial regions is push transmitted immediately after transmitting the description data without specific request for the image data of the broad spatial region including the plurality of spatial regions;

transmitting a request containing the address information to the providing apparatus; and receiving one or more segments corresponding to the address information from the providing apparatus.

16. A non-transitory computer readable storage medium storing a program for causing a computer to execute a data receiving method, comprising:

transmitting a request for description data to a providing apparatus;

receiving the description data and image data of a broad spatial region from the providing apparatus, wherein the description data includes at least (i) position information representing a spatial position of each of a plurality of spatial regions within a video, (ii) size information representing a spatial size of each of the plurality of spatial regions within the video, and (iii) a plurality of pieces of address information each of which is used for requesting image data of one of the plurality of spatial regions, wherein the image data of a broad spatial region includes the plurality of spatial regions, wherein the image data of the broad spatial region including the plurality of spatial regions is push transmitted immediately after transmitting the description data without specific request for the image data of the broad spatial region including the plurality of spatial regions;

transmitting a request containing the address information to the providing apparatus; and receiving one or more segments corresponding to the address information from the providing apparatus.

* * * * *